Sept. 7, 1926.  1,598,925
J. MURPHY
COMBINATION LAMP AND HALL TREE
Filed March 29, 1926
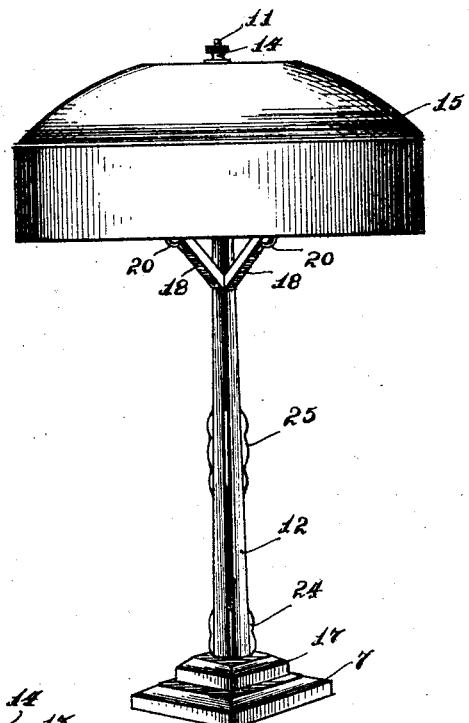
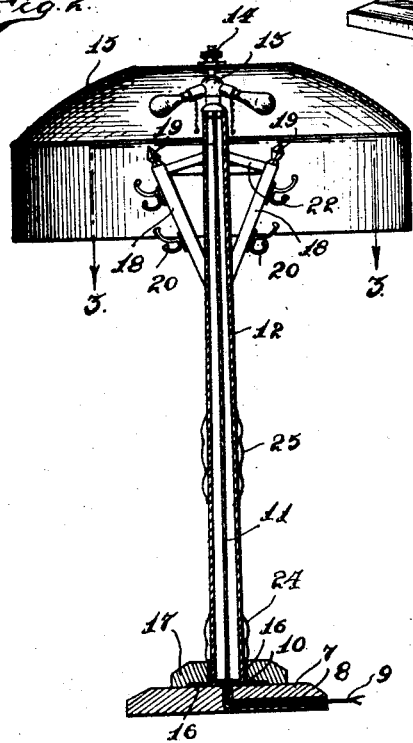
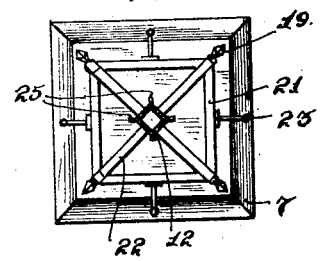
INVENTOR.
James Murphy
BY
ATTORNEY.

Patented Sept. 7, 1926.

1,598,925

UNITED STATES PATENT OFFICE.

JAMES MURPHY, OF DETROIT, MICHIGAN.

COMBINATION LAMP AND HALL TREE.

Application filed March 29, 1926. Serial No. 98,086.

My invention relates to a combination lamp and hall tree, and has for its object the provision of a device of this kind which will be simple in structure, economical of manufacture and highly efficient in use and ornamental.

Another object of the invention is the provision of a device of this class of a supporting standard having a plurality of upwardly inclined arms connected together with braces and adapted for carrying coat hooks and the like.

Another object of the invention is the provision of a base for supporting said upright support and novel means for mounting said support on said base in a durable and rigid manner.

Other objects will appear hereinafter.

The invention consists in the combination and arrangement of parts hereinafter described and claimed.

The invention will be best understood from a reference to the accompanying drawings which form a part of this specification, and in which—

Fig. 1 is a side elevational view of the invention.

Fig. 2 is a longitudinal vertical sectional view of the invention illustrating a shade mounted thereon.

Fig. 3 is a top plan view taken on substantially line 3—3 of Fig. 2.

As shown in the drawings the invention comprises a base 7, having a groove 8 formed on its undersurface for accommodating the wiring 9 which is led upwardly through a central opening 10, formed in the base, and extended through a pipe 11, which projects above a supporting standard 12, and serves as a support for the light sockets 13, a nut 14 being threaded on the pipe 11 for securing in position the shade 15.

The supporting standard 12 is formed tubular as shown and is secured to the base 7 by L-shaped brackets 16, which are suitably secured by bolts or screws or in any other suitable manner to the standard 12 and to the base 7. A collar 17 is provided for embracing the standard 12 and concealing the brackets 16, this collar 17 being secured by screws or in any other suitable manner to the base 7. The fit of the collar 17 around the standard 12 is a snug one so that lateral movement of the standard 12 relatively to the base 7 is prevented.

Secured to the standard 12 by screws, glue, or in any other suitable manner and projecting upwardly, outwardly inclined from the standard 12, are arms 18, each of which is provided with a pointed head 19 to serve as a support for a hat, cloak, or the like.

Mounted on the arms 18 are coat hooks 20. As shown in Fig. 3 adjacent arms are connected together by means of braces 21 which extend horizontally. Connecting the braces 21 and the arms 18 at their point of contact to the upright support 12 are radially extending arms or braces 22, which as shown in Fig. 2, incline upwardly slightly toward the post 12 from their juncture with the arms 16 and the braces 21. Suitable coat hooks 23 are carried by the braces 21. A molding 24 is mounted on the support 12 above the base 7 and preferably in engagement with the upper surface of the collar 17, a similar molding 25 being positioned on the support 12 intermediate its ends.

The structure is one which permits a manufacture of the device and its shipment in a knock-down form so that it may be readily assembled by unskilled labor. The device in addition to performing the function required of a hall tree also serves the purposes of a floor lamp, thus combining in one article two pieces of furniture. It is thus seen that the floor lamp may be utilized throughout the entire twenty-four hours.

While I have illustrated and described the preferred form of structure, I do not wish to limit myself to the precise form of structure shown, but desire to avail myself of such variations and modifications as come within the scope of the appended claims.

Having thus described my invention what I claim as new and desire to secure by Letters Patent is:—

1. A combination floor lamp and hall tree comprising: a base having an opening formed centrally therein and communicating with a groove formed on its undersurface; a tubular standard positioned on said base over said opening and projecting upwardly therefrom; brackets secured to said standard and the upper surface of said base for retaining said standard in position on said base; a collar mounted on said base and positioned on said standard and adapted for snug engagement therewith at its lower end, said collar serving as a cover for said brackets; a plurality of arms projecting diagonally, upwardly, outwardly from said standard and secured at their lower ends to said standard; braces for connecting the upper ends of adjacent arms; and means for connecting said braces and said arms at their point of juncture with said standard.

2. A combination floor lamp and hall tree comprising: a base having an opening formed centrally therein and communicating with a groove formed in the undersurface of said base; a tubular standard mounted over said opening and projecting upwardly from said base; brackets for securing said standard to said base; a collar mounted on said base and embracing the lower end of said standard in snug relation; a plurality of upwardly projecting, outwardly inclined arms on said standard at its upper end; braces for connecting adjacent arms adjacent their upper ends, said braces lying horizontal; inwardly directed means for connecting said braces and said arms at their points of juncture with said standard, said means being inclined to the horizontal; coat hooks mounted on said arms and on said braces.

3. In a combination hall tree and floor lamp of the class described; a base; a supporting standard mounted upon and projecting upwardly from the undersurface of said base; brackets for securing said standard to said base; means mounted on the upper surface of said base and embracing in snug relation the lower end of said standard for preventing relative movement of said standard and said base and effecting a concealment of said brackets; a frame-work carried by said standard adjacent its upper end, said framework comprising a plurality of arms; coat hooks carried by said arms; and a rod projected through said base and said standard, said rod projecting beyond the upper end of said standard for providing a supporting member for a lamp shade.

In testimony whereof I have signed the foregoing.

JAMES MURPHY.